J. J. HEIM.
VEHICLE WHEEL.
APPLICATION FILED JULY 19, 1915.
1,189,567.
Patented July 4, 1916.
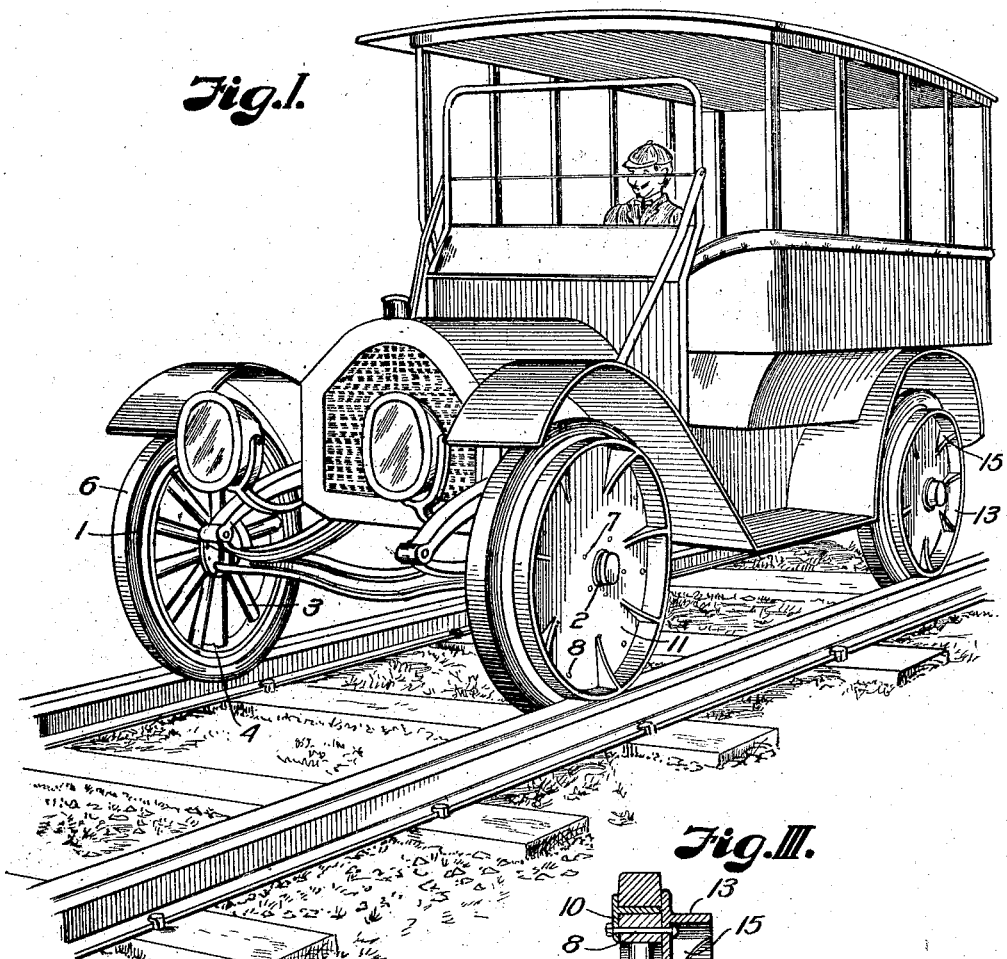
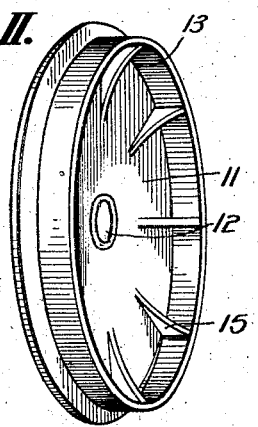
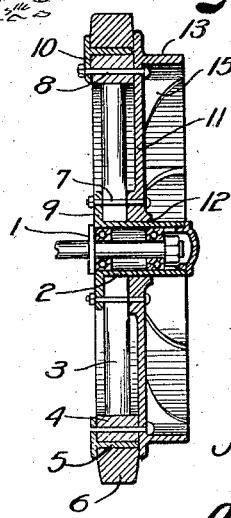
INVENTOR
Joseph J. Heim,
BY
Arthur C. Brown
ATTORNEY

UNITED STATES PATENT OFFICE.

JOSEPH J. HEIM, OF KANSAS CITY, MISSOURI.

VEHICLE-WHEEL.

1,189,567.   Specification of Letters Patent.   Patented July 4, 1916.

Application filed July 19, 1915.   Serial No. 40,619.

*To all whom it may concern:*

Be it known that I, JOSEPH J. HEIM, a citizen of the United States, residing at Kansas City, in the county of Jackson and State of Missouri, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle wheels and has for its principal object to provide a wheel for motor vehicles that may adapt a vehicle equipped therewith for both roadway and track use.

In a great many localities, particularly in the agricultural districts, there are small towns or well settled districts contiguous to but not directly on a railroad or interurban line; the residents of which can only reach said lines, or cities and towns through which they pass, over wagon roads. Such roads are frequently of such nature as to render traffic thereover both slow and tedious, particularly in bad weather, with the result that the residents of the smaller settlements or districts experience considerable inconvenience and expense in communication with, and particularly, in carrying products to and commodities from the transportation lines and market towns.

While there may be sufficient traffic from and to such small districts to warrant the necessary expenditure for installing steam or electrical transportation lines thereto, a less expensive system of transportation would be warranted, and in seeking to provide such a relatively inexpensive system I have devised the present invention.

Primarily the invention consists in equipping a motor vehicle with wheels which may run on an ordinary roadway or on a railway track, it being the intention that for a greater portion of the distance between the terminals of the transportation line upon which the vehicle is used, travel may be over the track of the usual construction, but to increase the mobility of the vehicle and obviate the necessity for special franchises or privileges, I provide for interrupting or terminating the track at railway crossings, at city limits or other points, so that the vehicle may run off of the railway track onto the road or street, and there proceed as an ordinary motor vehicle or truck.

In carrying out my invention I have provided improved details of structure; the preferred forms of which are illustrated in the accompanying drawings, wherein:—

Figure I is a perspective view of a motor vehicle equipped with my improved wheels, and illustrating their use on a railway track. Fig. II is a detail perspective view of the flange member that adapts an ordinary vehicle wheel for track use. Fig. III is a diametric section of a vehicle wheel embodying my improvements.

Referring more in detail to the drawings: 1 designates a vehicle wheel, which may be of any suitable construction, but is here shown to comprise the hub 2, spokes 3, felly 4, rim clamp 5 and solid tire 6; which parts may be of any ordinary and well known construction, as my invention does not require any particular or improved structure in the body of the wheel.

Attached to the wheel 1, preferably by bolts 7—8 that extend through the spokes and wheel felly and through the hub and rim flanges 9—10, is a web 11, having a central aperture 12 through which the hub 2 is projected, and having a laterally directed circular rim 13 adjacent its periphery; the diameter of the web being less than that of the tire 6, but preferably the same as that of the rim flange 10, so that the outer portion of the web serves as a ring to hold the tire in place.

It is well known that the tread of an ordinary automobile or motor vehicle is such that the wheels may run between and closely adjacent the rails of a broad gage track. Under this condition, the laterally projecting rim 13 on the web 11 will overlie the track rails when the vehicle is driven onto the track, so that the rims 13 may serve as track wheels to carry the vehicle on the track, and by setting the rim inside of the periphery of the web, the part of the web outside of the rim serves as a flange that may bear against the inner edge of the ball of the rail to hold the wheel in place and take up the wear and protect the wheel felly and tire.

In order to stiffen the rim so that it may support the weight of the vehicle on the track, I provide wings 15 that fill the angle between the rim and the web, and which may be of sufficient number to provide the required strength and rigidity to the rim.

In using my invention, wheels may be manufactured with the improvements embodied therein, or, if it is desired to equip a previously made vehicle with the improvements, the web and rim member may be made as a separate piece and attached to the wheel by the bolts heretofore described.

With the wheel equipped with the improvements and with the motor vehicle mounted on wheels so equipped, the vehicle may be run over a street or road as an ordinary automobile or truck; the tread being on the rubber tire as the track rim is inset from the tire, and will not touch the ground unless the tires sink into a soft roadway.

When the route of the vehicle leads from one locality to a market town or railway junction, a track may be laid from one terminal to the other and terminate at the municipal limits, and, if necessary, be interrupted at a crossing of a railway or at bridge points; the termination of the track at opposite sides of the railway or bridge points being so arranged that the vehicle may run off the track onto the roadway, cross the railroad or bridge on the roadway and then return to its rails.

When a vehicle equipped with my improvements starts from one terminal to the other it runs off of the roadway onto the track; inclines (not shown) being preferably provided to run the vehicle up, so that the wheel rims may ride onto the rails. When the vehicle is on the rails it is supported from the rims 13 with the tires 6 above and out of contact with the ground, so that the vehicle may be driven along the track at a speed which would be impossible on the ordinary roadway even in good weather.

When the vehicle reaches an interrupted part of the track it runs off of the track onto the roadway, travels over the railroad track or bridge on the ordinary tires 6 and then returns to the track at the opposite side of the railroad track or bridge, where it resumes its track travel until again interrupted, or until it reaches the terminal. If the terminal is at a city limits, the track may be arranged to run the vehicle onto a paved street.

It is apparent that while my improvements make it possible to run a motor vehicle over a track the weight of it is so materially less than that of an ordinary car as to make possible the use of very light rails and inexpensive roadbed, and as the vehicle may run over the track onto the road, the cost of terminal and crossing facilities is eliminated, so that transportation of this character may be provided for the localities that would not warrant the expenditure necessary for the installation and maintenance of steam or other interurban railway lines.

Having thus described my invention, what I claim as new therein, and desire to secure by Letters-Patent, is:

1. A vehicle wheel comprising separate tread members of different diameter, the tread member of less diameter having an outstanding flange adjacent its edge, for the purpose set forth.

2. A vehicle wheel comprising a body part, having a resilient tread member, and a metallic rim fixed to the body part and forming a tread member of less diameter than the resilient tread, and an outstanding flange on the inner edge of the metallic rim adjacent the resilient tread, for the purpose set forth.

3. A vehicle wheel comprising a body member, having a resilient tread, and a metallic rim on said body member, of less diameter than the resilient tread and having an integral outwardly extended flange at its inner edge, for the purpose set forth.

4. A vehicle wheel comprising a body member, having a resilient tread, and a metallic plate secured to the body member and having a circular rim of less diameter than the resilient tread and inset from the edge of the plate to form a supplemental tread and expose a flange portion on said plate.

5. A vehicle wheel comprising a body member, a web attached to the body member and terminating short of the circumference thereof, means for attaching the web to the body member and a rim integral with and projecting laterally from the web, and spaced inwardly from the edge of the web to provide a web flange, for the purpose set forth.

6. The combination with a vehicle wheel comprising spokes, a felly, a rim clamp and a tire, of a web, bolts extending through the spokes and web, and other bolts extending through the felly, the rim clamp and the web to bolt the web to the wheel, and a rim extending laterally from the web, the said rim being inset from the edge of the web, and the web being extended beyond the body of the rim clamp to form a tire securing rim and track flange, substantially as set forth.

In testimony whereof I affix my signature.

JOSEPH J. HEIM.